US012665506B2

(12) United States Patent
Zhang

(10) Patent No.: US 12,665,506 B2
(45) Date of Patent: Jun. 23, 2026

(54) METHODS AND CIRCUITS FOR CONSTANT ON-TIME CONTROL OF SWITCHING POWER SUPPLIES

(71) Applicant: Rambus Inc., San Jose, CA (US)

(72) Inventor: Xin Zhang, San Jose, CA (US)

(73) Assignee: Rambus Inc., San Jose, CA (US)

( * ) Notice: Subject to any disclaimer, the term of this patent is extended or adjusted under 35 U.S.C. 154(b) by 256 days.

(21) Appl. No.: 18/402,259

(22) Filed: Jan. 2, 2024

(65) Prior Publication Data

US 2024/0250612 A1     Jul. 25, 2024

Related U.S. Application Data

(60) Provisional application No. 63/480,907, filed on Jan. 20, 2023.

(51) Int. Cl.
H02M 3/156     (2006.01)
H02M 1/00     (2006.01)
H02M 1/14     (2006.01)

(52) U.S. Cl.
CPC ......... H02M 3/156 (2013.01); H02M 1/0025 (2021.05); H02M 1/14 (2013.01)

(58) Field of Classification Search
CPC .... H02M 3/156; H02M 3/158; H02M 3/1588; H02M 3/155; H02M 3/1582; H02M 3/157; H02M 3/1563; H02M 3/1584
See application file for complete search history.

(56) References Cited

U.S. PATENT DOCUMENTS

| | | | |
|---|---|---|---|
| 8,446,135 | B2 | 5/2013 | Chen et al. |
| 9,912,236 | B2 | 3/2018 | Li |
| 9,941,792 | B2 | 4/2018 | Jing et al. |
| 10,270,330 | B2 | 4/2019 | Engelhardt et al. |
| 10,411,595 | B2 | 9/2019 | Shao |
| 11,095,221 | B1 | 8/2021 | Hsu |
| 11,842,930 | B2 | 12/2023 | Huang et al. |
| 2015/0277460 | A1* | 10/2015 | Liu ........................... G05F 1/56 |
| | | | 323/280 |
| 2021/0184573 | A1* | 6/2021 | Zhang ................... H02M 3/158 |

OTHER PUBLICATIONS

Ni, C. & Tetsuo, T., "Adaptive Constant On-Time (D-CAP) Control Study in Notebook Application," Texas Instruments, Jul. 2007, SLVA281B (9 pages).

* cited by examiner

*Primary Examiner* — Bryan R Perez
(74) *Attorney, Agent, or Firm* — Arthur J. Behiel; Silicon Edge Law Group LLP

(57)     ABSTRACT

A switching power supply employs constant-on-time control to maintain an output-voltage signal across a load. The output-voltage signal includes DC and ripple components. An error amplifier issues an error signal responsive to deviations between the DC component and a reference. A ripple injector integrates the DC and ripple components into a feedback signal. A constant on-time control circuit uses both the error signal and the integrated feedback signal to suppress transient DC fluctuations of the output voltage and improve DC regulation.

18 Claims, 2 Drawing Sheets

SW

FB2

Ripple Injector 135

180    175

Vfb_w_ripple

Duty-Cycle (COT) Control 130

Vo

FB1

Vref

165

170

155

Vref_corr_DC

Timer 160

LsOn     HsOn

Error Amp 125

Vin

VDRV_Hs

HsOn

Int 140

145     150

120

SW

Vo

VDRV_Ls

115

LsOn 145     150

Load 105

GND

Switching Circuit 110

200

205

210

METHODS AND CIRCUITS FOR CONSTANT ON-TIME CONTROL OF SWITCHING POWER SUPPLIES

BACKGROUND

Power supplies for electronic circuits sometimes produce voltages that are too high for the circuits they power. For example, batteries for mobile electronics, such as cellular phones and wearable devices, can produce voltages that are multiples of what is required to power the integrated circuits employed for processing and memory. Circuits called "buck converters" can be used in such applications to produce relatively low and stable output voltages from a range of higher input voltages.

BRIEF DESCRIPTION OF THE DRAWINGS

The present invention is illustrated by way of example, and not by way of limitation, in the figures of the accompanying drawings.

DETAILED DESCRIPTION

Figure 1:
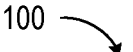
FIG. 1 depicts a buck converter 100, a switching power supply that employs constant-on-time control to maintain a constant output voltage Vo across a load 105.

FIG. 1 depicts a buck converter 100, a switching power supply that employs constant-on-time control to maintain an output voltage Vo across a load 105. A switching circuit 110 directs pulses of current from a supply node Vin to charge a capacitor 115 via an inductor 120. The longer the pulses of current, the more power delivered to load 105 to maintain output voltage Vo. The current switching introduces undesirable noise, or "ripple," on output voltage Vo. Buck converter 100 employs feedback that integrates ripple information with transient DC fluctuations of voltage Vo to improve DC regulation.

Switching circuit 110 is connected to an input-voltage supply node Vin, the voltage of which is greater than output voltage Vo. Each current pulse from switching circuit 110 and through inductor 120 creates a magnetic field that stores energy to be released into capacitor 115 when switching circuit 110 opens. The current from inductor 120 effects the voltage across capacitor 115, and thus output voltage Vo. In this example, voltages are measured with reference to a second supply node GND, or ground potential.

Output voltage Vo is fed back to an error amplifier 125 that issues an error signal Vref_corr_DC proportional to the difference between output voltage Vo and a reference voltage Vref. A duty-cycle control circuit 130 times the assertion and de-assertion of switch control signals HsOn and LsOn, and thus the "on time" relative to the "off time" of switching circuit 110, responsive to error signal Vref_corr_DC. In this example, control circuit 130 varies the ratio of on-time to the period, a parameter sometimes referred to as the "duty cycle," by maintaining a constant on-time and varying the off-time of switching circuit 110.

Switching circuit 110 includes two switches 150 connected in series between supply nodes Vin and GND and under independent control by duty-cycle control circuit 130. The high-side switch 150 serves as the primary power switch; switching circuit 110 is on when switch 150 is on. Low-side switch 150, off when high-side switch 150 is on and vice versa, serves as a synchronous rectifier. The low-side switch 150 can be replaced with a free-wheel diode in other embodiments.

A ripple injector 135 integrates ripple information from a switching signal SW with DC information from output voltage Vo to derive a feedback signal Vfb_w_ripple. Control circuit 130 compares feedback signal Vfb_w_ripple with error signal Vref_corr_DC, the comparison reducing the impact of jitter on the feedback path that can otherwise produce instability in output voltage Vo. The integration of DC and ripple information in signal Vfb_w_ripple improves DC regulation of output voltage Vo.

Ripple injector 135, error amplifier 125, and duty-cycle control circuit 130 are instantiated together on an integrated-circuit chip in this example. Switching circuit 110, which may be integrated or be separated from the chip, includes an interface 140 that conditions signals HsOn (for "high-side on") and LsOn (for "low-side on") as needed (e.g., to increase the voltage or current levels) from control circuit 130 to manage high-side and low-side drivers 145. High-side and low-side drivers 145, respectively powered by supply voltages VDRV_Hs and VDRV_Ls, turn switches 150 on and off in time with signals HsOn and LsOn. Depicted as switches with parallel diodes, switches 150 can be implemented using e.g. power MOSFETs. High-side switch 150 has a first current-handling terminal connected to input supply node Vin and a second current-handling terminal connected to switching node SW and closes when signal HsOn is asserted. Low-side switch 150 behaves similarly responsive to signal LsOn to connect switching node SW to supply node GND.

Duty-cycle control circuit 130 includes a comparator 155 and a timer 160. If error signal Vref_corr_DC is greater than (less than) feedback signal Vfb_w_ripple, comparator 155 instigates timer 160 to control signals HsOn and LsOn to raise (lower) the voltage on output node Vo.

Control circuit 130 implements a constant on-time (COT) control technique in which the on-time of switching circuit 110 is maintained constant and the off-time is varied as needed to regulate the output voltage. COT buck converter 100 offers fast transient response, meaning it quickly adjusts output voltage Vo in response to changes in input voltage Vin. Control circuit 130 can, in some embodiments, transition smoothly between pulse width modulation (PWM) and pulse frequency modulation (PFM). PWM is typically used when a high level of accuracy is required, while PFM is used when a lower level of accuracy is an acceptable tradeoff for reduced power consumption.

Error amplifier 125 includes an amplifier 165 and a filter capacitor 170. Amplifier 165 includes a feedback node FB1 connected to output node Vo and produces error signal Vref_corr_DC based on the difference between output signal Vo and a reference voltage Vref. Differences between output voltage Vo and reference voltage Vref stimulate circuit 130 to control switching circuit 110 to reduce that difference. Amplifier 165 can be e.g. a proportional integral stage, an integrator, or a gain stage.

Ripple injector 135 has a second feedback node FB2 coupled to switching node SW to receive the ripple information provided by the switching signal. (In other embodiments, this switching information is generated by replica circuits stimulated by signals HsOn and LsOn.) A resistor 175 and a capacitor 180 connect respective feedback nodes FB2 and FB1 to node Vfb_w_ripple. Ripple injector 135 uses AC-coupling capacitor 180 to integrate ripple information from switching signal SW with DC information from output signal Vo to derive a feedback signal Vfb_w_ripple. Sharing the DC information of signal Vo with both error amplifier 125 and ripple injector 135 reduces the dominance of error amplifier 125 on the loop transient response of converter 100, and thus improves both DC regulation and transient response.

The embodiment of FIG. 1 feeds back the ripple component of output voltage signal Vo from switching node SW and the DC component from output signal Vo. The ripple and DC components used for ripple injection and error detection are derived from other nodes in other embodiments.

Figure 2A:
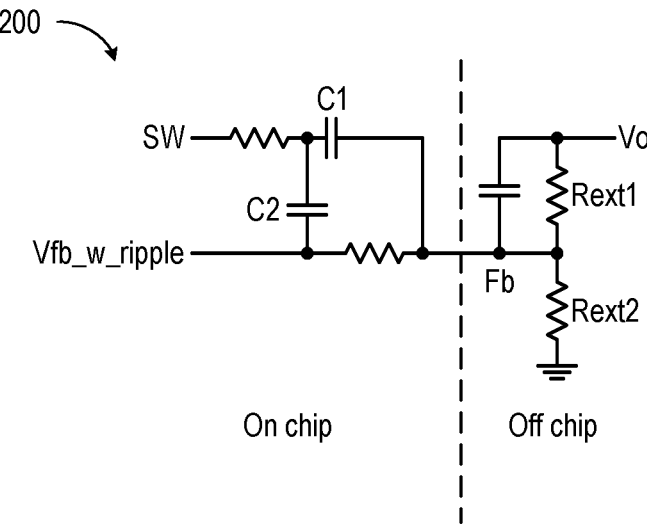
FIG. 2A depicts a ripple injector 200 in accordance with an embodiment in which the integrated circuit, or "chip," instantiating control circuit 130 is separate from switching circuit 110 and lacks direct access to output voltage Vo.

FIG. 2A depicts a ripple injector 200 in accordance with an embodiment in which the integrated circuit, or "chip," instantiating control circuit 130 lacks direct access to output voltage Vo due to pinout definitions, etc. External resistors Rext1 and Rext2 and a filter capacitor provide a feedback voltage Fb that conveys the DC information of signal Vo to the on-chip portion of ripple injector 200. A capacitor C1 integrates this DC information with ripple information from switching signal SW and the combined DC and ripple information is provided on node Vfb_w_ripple via a second capacitor C2.

Figure 2B:
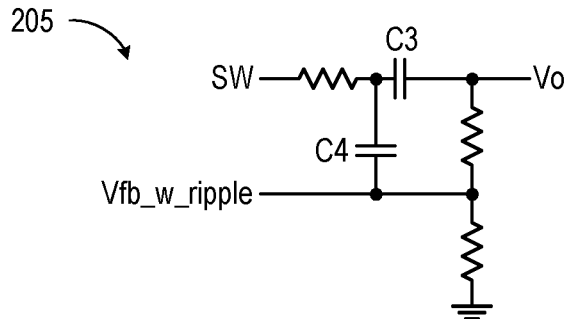
FIG. 2B depicts a ripple injector 205 in accordance with an embodiment in which the chip instantiating control circuit 130 can access both nodes SW and Vo.

FIG. 2B depicts a ripple injector 205 in accordance with an embodiment in which the chip instantiating control circuit 130 can access both nodes SW and Vo. A capacitor C3 integrates DC information from signal Vo with ripple information from switching signal SW and the combined DC and ripple information is provided on node Vfb_w_ripple via a second capacitor C4.

Figure 2C:
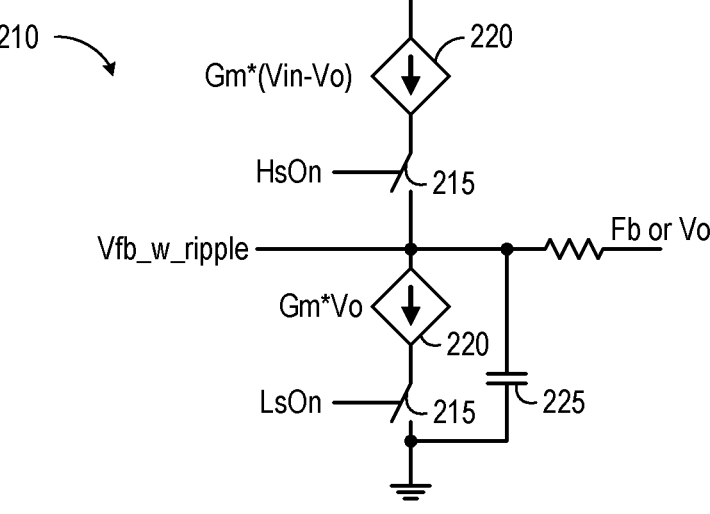
FIG. 2C depicts a ripple injector 210 in accordance with an embodiment in which the chip instantiating control circuit 130 lacks access to switching node SW and so includes ripple-replication circuitry to generate ripple information on node Vfb_w_ripple.

FIG. 2C depicts a ripple injector 210 in accordance with an embodiment in which the chip instantiating control circuit 130 lacks access to switching node SW and so includes ripple-replication circuitry to generate ripple information on node Vfb_w_ripple. Switches 215 under control of signals HsOn and LsOn switch the current through current sources 220 to induce a ripple timed to switching circuit 110 (FIG. 1). A capacitor 225 integrates the ripple with feedback provided by a feedback signal Fb or output voltage Vo to provide feedback signal Vfb_w_ripple to control circuit 130 (FIG. 1). Implementing the ripple injector using active circuits tends to reduce chip area and increase power usage.

While the invention has been described with reference to specific embodiments thereof, it will be evident that various modifications and changes may be made thereto without departing from the broader spirit and scope of the invention. Variations of these embodiments will be apparent to those of ordinary skill in the art upon reviewing this disclosure. Moreover, some components are shown directly connected to one another while others are shown connected via intermediate components. In each instance the method of interconnection, or "coupling," establishes some desired electrical communication between two or more circuit nodes, or terminals. Such coupling may often be accomplished using different circuit configurations, as will be understood by those of skill in the art. Therefore, the spirit and scope of the appended claims should not be limited to the foregoing description. Only those claims specifically reciting "means for" or "step for" should be construed in the manner required under the sixth paragraph of 35 U.S.C. § 112.

What is claimed is:

1. A power supply comprising:
    a switch having a switch control terminal, a first current-handling terminal connected to an input-voltage supply node, and a second current-handling terminal connected to a switching node, the switch to generate a switching signal on the switching node responsive to a switch-control signal on the switch control terminal;
    an inductor having a first inductor terminal connected to the switching node and a second inductor terminal connected to an output-voltage supply node to issue a power-supply output signal having a DC component and a ripple component;
    an error amplifier having a first feedback node coupled to the output-voltage supply node to receive the power-supply output signal and an error node to issue an error signal responsive to the power-supply signal;
    a ripple injector having a capacitor coupled to the first feedback node to receive the power-supply output signal, and a second feedback node to receive at least one of the switching signal and a replica of the switching signal, and a ripple-injector output node, the ripple injector to integrate the DC component of the power-supply output signal and the at least one of the switching signal and the replica of the switching signal to develop a feedback signal on the ripple-injector output node; and
    a constant on-time control circuit coupled to the error node to receive the error signal, the ripple-injector output node to receive the feedback signal, and to the switch control terminal, the constant on-time control circuit to selectively assert the switch-control signal for a fixed on-time and deassert the switch-control signal for an off-time that varies responsive to the error signal and the feedback signal.

2. The power supply of claim 1, the ripple injector further comprising a resistor in series with the capacitor between the second feedback node and the capacitor.

3. The power supply of claim 2, the ripple injector further comprising a ripple-injector output node between the resistor and the capacitor, the ripple-injector output node to issue a ripple-feedback signal to the constant on-time control circuit.

4. The power supply of claim 1, the error amplifier including a second capacitor connected between the error node and a supply terminal.

5. The power supply of claim 3, the constant on-time control circuit including a comparator having a first comparator input coupled to the ripple-injector output to receive the ripple-feedback signal, a second comparator input coupled to the error node to receive the error signal, and a comparator output node.

6. The power supply of claim 5, the constant on-time control circuit further including a timer circuit coupled to the comparator output to issue the switch control signal responsive to a comparison between the ripple-feedback signal and the error signal.

7. The power supply of claim 1, further comprising a replica circuit to develop the replica switching signal.

8. The power supply of claim 7, the replica circuit to develop the replica of the switching signal responsive to the switch-control signal.

9. An integrated circuit for controlling a switching power supply having a switching node to develop a switch signal and an output-voltage node to develop an output-voltage signal having a ripple component and a DC component, the integrated circuit comprising:

an error amplifier having a first feedback node coupled to the output-voltage node to receive the DC component of the output-voltage signal and an error node to issue an error signal responsive to the DC component;

a ripple injector to integrate the DC component of the output-voltage signal with at least one of the ripple component and a replica ripple component to issue an integrated feedback signal; and a constant on-time control circuit coupled to the error node to receive the error signal and the ripple injector to receive the integrated feedback signal, the constant on-time control circuit to selectively assert a switch-control signal for a fixed on-time and deassert the switch-control signal for an off-time that varies responsive to the error signal and the feedback signal.

10. The integrated circuit of claim 9, wherein the ripple injector includes a second feedback node coupled to the switching node to receive the ripple component.

11. The integrated circuit of claim 9, the ripple injector including a replica switch to develop the ripple component.

12. The integrated circuit of claim 9, the ripple injector including an AC-coupling capacitor to integrate the DC component with the ripple component.

13. The integrated circuit of claim 9, further comprising a replica circuit to generate the replica switching signal.

14. The integrated circuit of claim 13, the replica circuit to generate the replica of the switching signal responsive to the switch-control signal.

15. A method of generating an output voltage between terminals of a capacitor from an input voltage between input-voltage nodes, the method comprising:

drawing current from the input-voltage nodes to the capacitor over a sequence of on-times separated by off times to develop the output voltage across the capacitor, the output voltage having a DC component and a ripple component;

integrating the DC component of the output voltage with at least one of the ripple component and a replica of the ripple component to produce a feedback signal;

producing an error signal proportional to a difference between the DC component of the output voltage and a reference voltage; and adjusting the off times responsive to the feedback signal and the error signal.

16. The method of claim 15, further comprising replicating the ripple component to produce the replica of the ripple component.

17. The method of claim 16, wherein replicating the ripple component comprises switching a replica current responsive to the error signal.

18. The method of claim 15, wherein producing the error signal comprises integrating the difference between the DC component of the output voltage and the reference voltage.

* * * * *